SELF-THREADING MECHANISM FOR PROJECTORS

Filed Dec. 24, 1958 4 Sheets-Sheet 1

George H. Hanken
David L. Babcock
INVENTORS
BY R. Frank Smith
Steve W. Grembow
ATTORNEYS May 9, 1961 G. H. HANKEN ET AL 2,983,416

SELF-THREADING MECHANISM FOR PROJECTORS

Filed Dec. 24, 1958

George H. Hanken
David L. Babcock
INVENTORS

BY R. Frank Smith
Steve W. Gremban
ATTORNEYS

SELF-THREADING MECHANISM FOR PROJECTORS

Filed Dec. 24, 1958

George H. Hanken
David L. Babcock
INVENTORS
BY R. Frank Smith
Steve W. Gremban
ATTORNEYS George H. Hanken
David L. Babcock
INVENTORS
BY R. Frank Smith
Steve W. Grembow
ATTORNEYS

United States Patent Office 2,983,416
Patented May 9, 1961

2,983,416
SELF-THREADING MECHANISM FOR PROJECTORS

George H. Hanken and David L. Babcock, Rochester, N.Y., assignors to Eastman Kodak Company, Rochester, N.Y., a corporation of New Jersey Filed Dec. 24, 1958, Ser. No. 782,790

6 Claims. (Cl. 226—91)

This invention relates generally to motion picture projectors, and more specifically to a self-threading mechanism for such a projector.

Motion-picture projectors having a self-threading mechanism for automatically threading the film therethrough in which the operator merely inserts the leading edge of the film into the film entrance where it is engaged and advanced by a drive sprocket are well known in the art. Self-threading mechanisms of this general type are disclosed in U.S. Patents 1,694,110 and 2,420,587. In automatic threading projectors of the type disclosed in these patents, the threading mechanism incorporates film loop-forming members which are adapted to be moved by suitable linkage and a control knob into an operative or closed position for automatically threading the film through the projector. After the film has been threaded through the projector, it is necessary to move the control knob in order to position the loop-forming members into an inoperative or open position. One of the disadvantages of this type of threading mechanism is that once the loop-forming members have been moved into a closed position, it is impossible to move them to an open position without moving the control knob. This is particularly a problem in projectors having a single control knob that is selectively movable into one of three positions: a still or threading position in which the threading mechanism is in the closed position, and the projector drive mechanism is declutched from the drive sprockets; a forward position in which the drive mechanism is drivingly connected to the sprockets for moving the film through the projector in a forward direction for viewing the film on a screen; and a reverse rewind position for moving the film in the opposite direction. In a projector of this type, every time the control knob is moved to the threading position, the loop-forming members are urged into the closed position. Accordingly, it is impossible for the operator to move the loop-forming members into an open position as long as the control knob is in the threading position. To eliminate this disadvantage, applicants have developed a projector having an improved self-threading mechanism incorporating overriding means which make it possible for the operator to manually engage and move the loop-forming members into an open position without moving the control knob from the threading position.

The primary object of this invention is to provide an improved self-threading mechanism for an automatic threading projector, having overriding means for permitting manual opening of the loop-forming members without moving the control knob.

Another object of this invention is to provide an improved self-threading mechanism for a projector, having an overriding means for releasably interconnecting the control means and the loop-forming apparatus that is of simple design and construction, and thoroughly reliable and efficient in operation.

Objects and advantages other than those set forth above will be apparent from the following description when read in connection with the accompanying drawings, in which.

Figure 1:
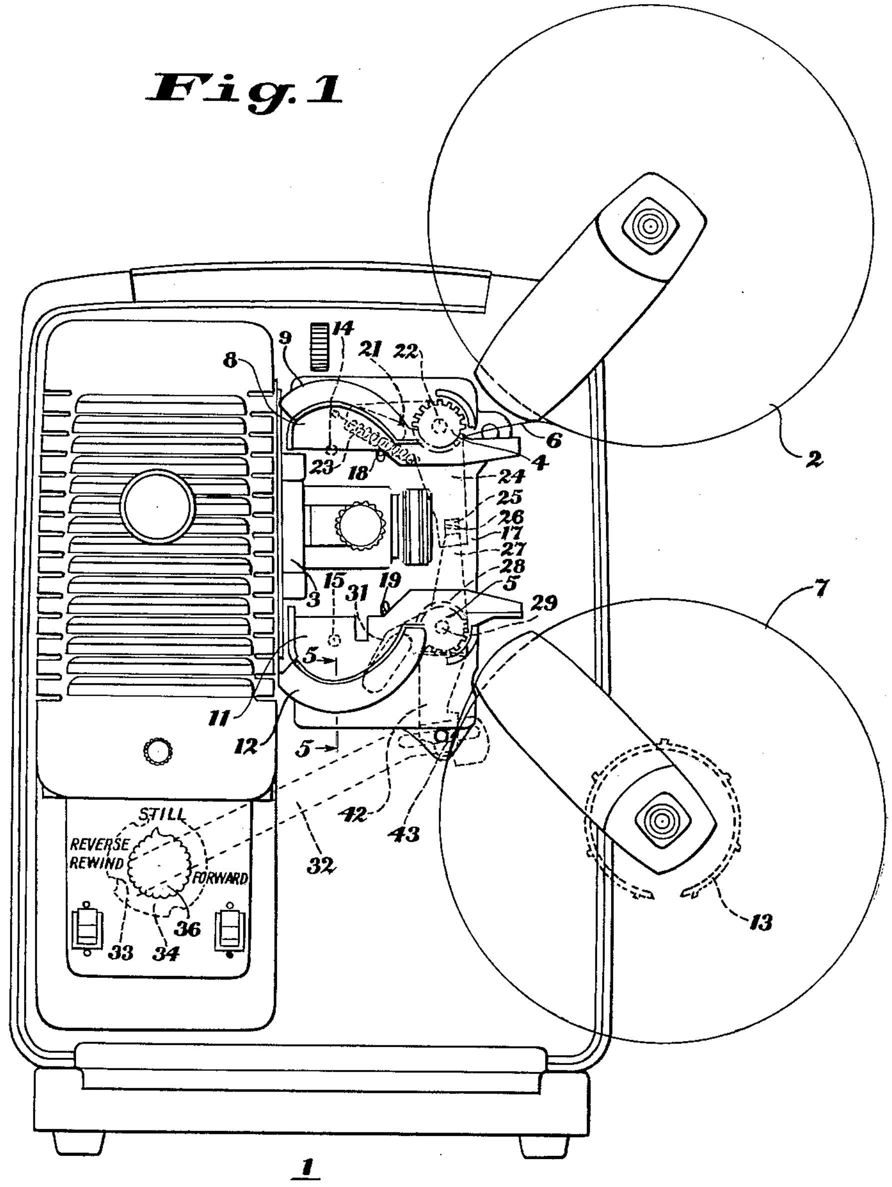
Fig. 1 is a side elevation view of a projector embodying the improved self-threading mechanism which is shown partly in full lines and partly dotted.
Figure 2:
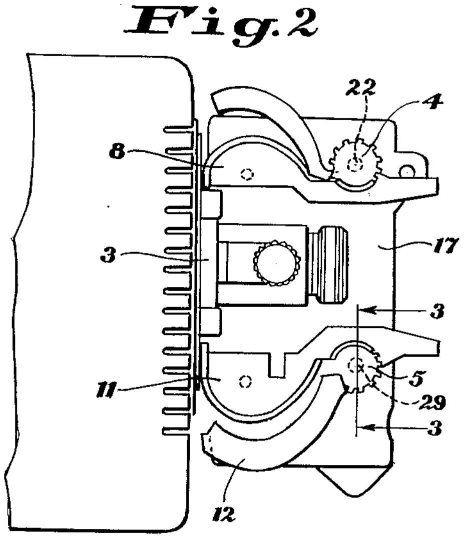
Fig. 2 is a segmental view of a portion of the projector of Fig. 1 showing the loop-forming members in an open position.

As shown in the drawings, a preferred embodiment of the invention is illustrated as applied to a motion-picture projector 1 of the normal type having a supply reel 2, a film gate 3, and drive sprockets 4, 5 for transporting a film 6 through film gate 3 and onto a take-up reel 7.

Figure 3:
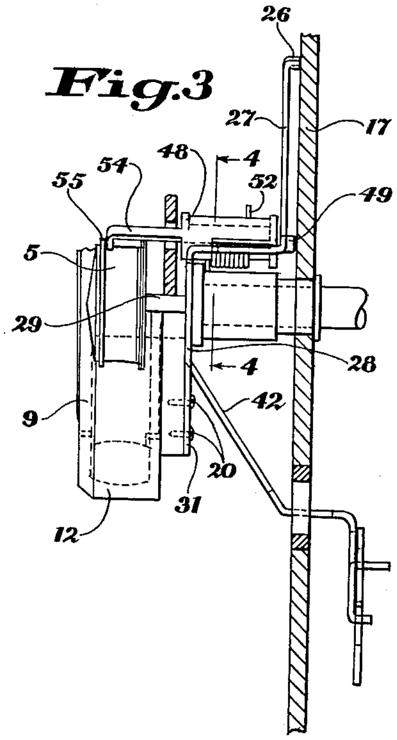
Fig. 3 is a segmental view partly in section taken substantially along line 3—3 of Fig. 2 and showing the trip mechanism.
Figure 5:
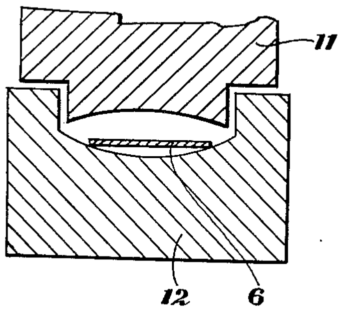
Fig. 5 is an enlarged fragmentary section view taken substantially along line 5—5 of Fig. 1 showing the loop forming members.
Figures 9, 10:
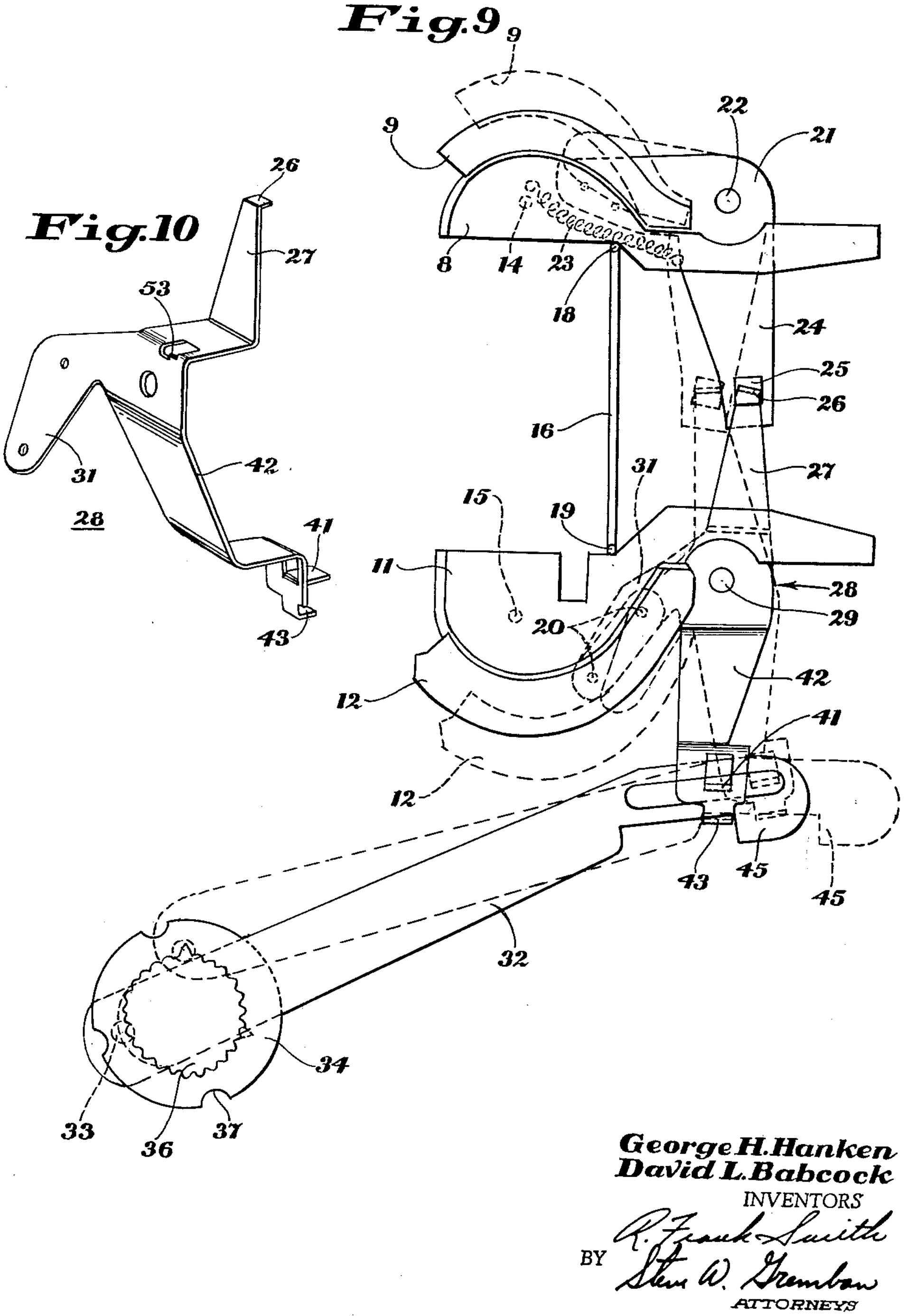
Fig. 9 is a side elevation view showing the threading mechanism in a closed position in full lines, and in an open position in dotted lines, the film sprockets and any supporting structure being omitted for purposes of clarity.
Fig. 10 is an enlarged perspective view of one of the loop forming levers.

The film-threading mechanism of this invention comprises a loop forming apparatus including an upper pair of loop-forming members 8 and 9 adapted in the closed position to guide film 6 from supply reel 2 into film gate 3, and a substantially identical lower pair of loop-forming members 11, 12 for guiding film 6 from film gate 3 onto take-up reel 7. The take-up reel 7 is provided with a hub member 13 having substantially radially extending teeth for automatically gripping the perforations in the end of film 6 and winding it onto take-up reel 7. The loop-forming members 8, 11 are pivoted on shafts 14, 15 respectively, and a U-shaped spring wire 16 as best seen in Fig. 9 carried by the projector housing 17 has one end 18 in engagement with loop-forming member 8 for urging it in a counterclockwise direction against a suitable stop, not shown, formed by projector housing 17. The other end 19 of spring 16 urges loop-forming member 11 in a clockwise direction against a similar stop. Each of the loop-forming members 8, 11 are arcuate segments of substantially U-shaped cross-section adapted to cooperate with the respective members 9, 12 to form a passageway for guiding and directing film 6 therethrough as shown in Fig. 5. The member 9 is secured by screws 20 as seen in Fig. 3 to one end of a bellcrank 21 shown best in Figs. 1 and 9 pivoted about shaft 22 to which drive sprocket 4 is secured, and biased by a spring 23 in a clockwise direction. The other end 24 of bellcrank 21 has a slot 25 for receiving a lug 26 formed by a substantially L-shaped arm 27 of a three-armed lever 28 as shown in Fig. 10 pivotally mounted on shaft 29 supporting drive sprocket 5. The loop-forming member 12 is secured by any suitable means to another arm 31 of lever 28.

Figures 6, 7, 8:
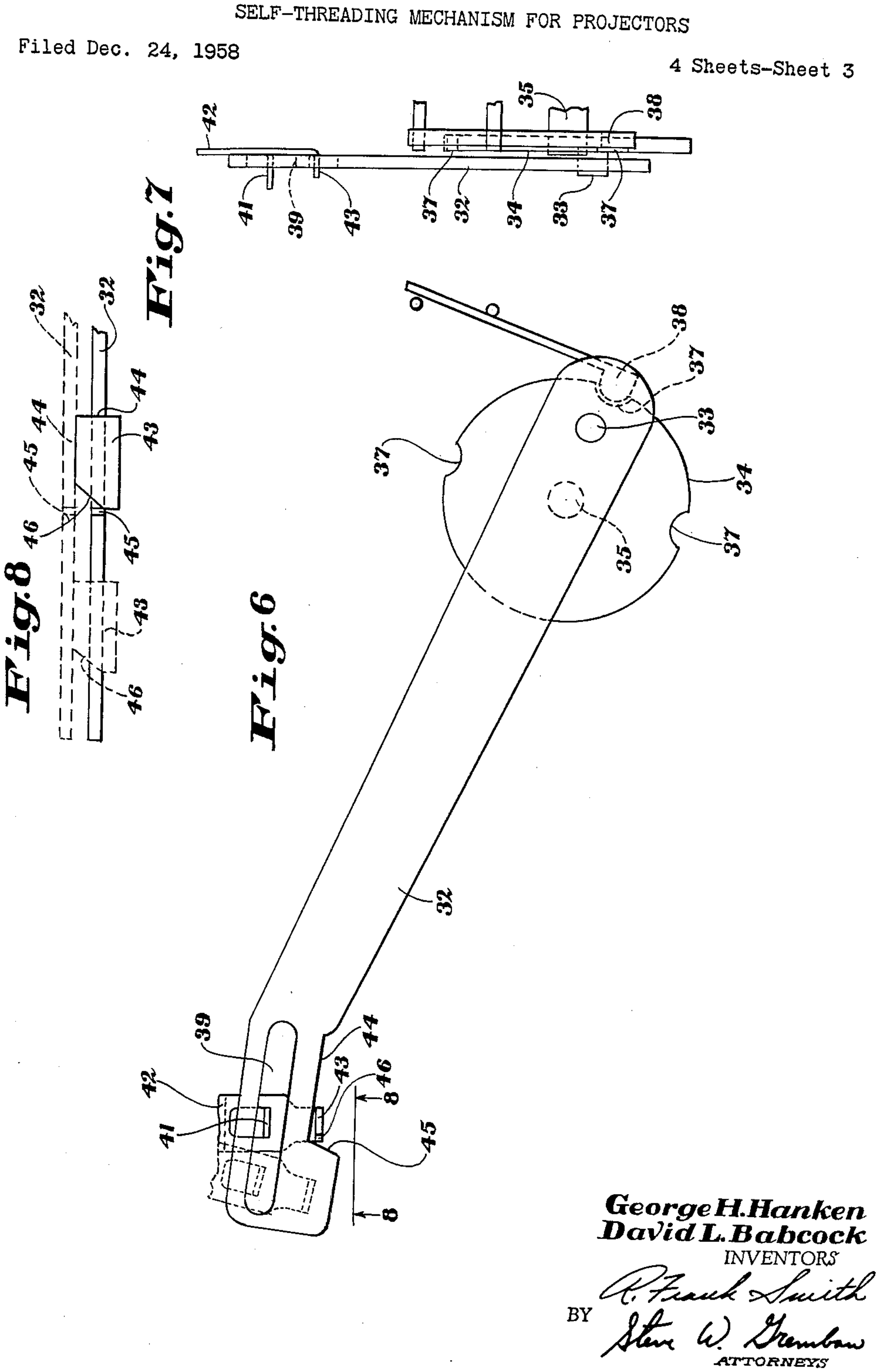
Fig. 6 is a side elevation view showing the overriding means with the control knob in the still or threading position.
Fig. 7 is a side elevation view of the structure of Fig. 6.
Fig. 8 is an enlarged view of the overriding means of Fig. 6 substantially taken along line 8—8.

The control means for the film-threading mechanism comprises a lever 32 having an opening near one end for receiving an eccentric pin 33 integral with a disc 34 as best shown in Figs. 6 and 9. This disc 34 further has an axial spindle 35 rotatably carried by the projector housing 17, and a control knob 36 secured to spindle 35 for selectively turning disc 34 into one of three positions. The disc 34 is provided with peripheral notches 37 engageable by a spring detent 38 for releasably holding disc 34 in a selected position. The opposite end of lever 32 has an elongated slot 39 for receiving a guide lip 41 punched out of another arm 42 of lever 28 as seen in Fig. 10. The arm 42 further has a lug 43 for slidably supporting a flat portion 44 of lever 32 which terminates in a hook 45 formed by the end of lever 32. The lug 43 has a sloping leading edge 46 as seen in Fig. 8.

Lug 43, flat portion 44 and hook 45 form an overriding means adapted when the control means is moved to a still or threading position in normal operation to positively connect the control means to the loop forming apparatus and urge the loop forming apparatus into a threading position. The positive connection is accomplished by hook 45 of the control means engaging lug 43 of the loop forming apparatus. If in this position, one of the loop forming members is directly engaged and manually urged into an open position, the positive connection between lug 43 and hook 45 is broken. This is accomplished by leading edge 46 of lug 43 camming hook 45 laterally, permitting lug 43 to override hook 45 without moving the control means. The reason lug 43 does not slip behind hook 45 when control knob 36 is moved from the forward or reverse rewind positions to the threading position is because the amount of force required to move levers 21, 28 and loop-forming members 9, 12 into the closed position is less than the force required to cause edge 46 of lug 43 to cam hook 45 laterally. On the other hand, when the loop forming members 9, 12 are moved into the open position while control knob 36 is in the threading position, edge 46 of lug 43 which is in engagement with hook 45 has to apply a tremendous force thereto to move control knob 36 from the threading position to either the forward or reverse rewind positions by virtue of the position of the eccentric pin 33. Consequently, when the loop-forming members 9, 12 are manually moved into an open position, before the force applied thereto can build up to a value even closely approaching the force required to move lever 32 and control knob 36 into a forward or reverse rewind position, the positive connection between lever 32 of the control means and lever 28 of the loop forming apparatus is broken. This is accomplished by leading edge 46 of lug 43 camming hook 45 of lever 32 laterally, permitting lug 43 to override hook 45 since this requires a lesser force.

Figure 4:
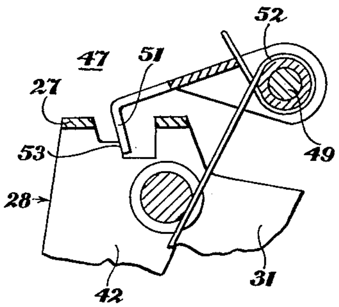
Fig. 4 is a section view substantially taken along line 4—4 of Fig. 3.

The projector is provided with a trip mechanism actuable by the film 6 being threaded through the projector 1 for automatically releasing the loop-forming members 9, 12 which are urged by spring 23 into an open position so that film 6 is out of engagement with the loop-forming members 9, 12 while it is being projected. A latch 47 for holding the loop-forming members 9, 12 in a closed position comprises a lever 48 pivotally mounted on shaft 49, and having a lip 51 urged by a spring 52 into engagement with a stepped portion 53 formed by lever 28 as best seen in Figs. 3, 4 and 10. For releasing latch 47, lever 48 is provided with a tripping arm 54 having its end 55 projecting into the path of film 6 as it passes over drive sprocket 5. When the leading edge of film 6 as it is threaded through the projector 1 strikes tripping arm 54, it urges arm 54 upwardly withdrawing lip 51 from step 53 and permitting spring 23 to urge levers 21, 28 and loop-forming members 9, 12 into an open position as seen dotted in Fig. 9.

In the type of projector described herein, whenever the control knob 36 is moved into the still or threading position, the loop-forming members 9, 12 are moved into the closed position by virtue of the eccentric pin 33, lever 32, and hook 45 which engages the leading edge 46 of lug 43. Moving the control knob 36 from the threading position to either the forward or reverse rewind position does not affect the closed loop-forming members 9, 12 since the flat portion 44 of lever 36 merely slides along lug 43 as seen dotted in Fig. 9. Let us assume that control knob 36 is moved to the forward position causing a clutch to drivingly connect the projector drive motor to sprockets 4, 5. Since the clutch and drive motor do not form a part of the invention, they are not shown in the drawings nor are they explained in detail, it being evident that any suitable form of clutch or drive motor may be used. The film 6 from supply reel 2 is introduced into the projector 1 and carried therethrough by the drive sprockets 4, 5 and wound onto take-up reel 7. As the leading edge of film 6 strikes tripping arm 54, it automatically releases the loop-forming members 9, 12 which are urged by spring 23 into the open position. Should the operator desire to stop the projection at this stage of operation for any particular reason, he must move control knob 36 to the threading position to declutch the projector drive mechanism from the drive sprockets. Moving control knob 36 to the threading position causes hook 45 to engage lug 43 and urge the loop-forming members 9, 12 into a closed position. Should the operator desire to open the loop-forming members 9, 12 while control knob 36 is in the threading position so that he can have better access to the film for adjusting the film in the film gate, removing a jam therein or for any other reason, this can be accomplished by merely placing a finger on the end of one of the loop-forming members 9, 12 and manually urging it into an open position. The latch 47 does not present a deterent to such movement since it is retained in an unlatched position by film 6 threaded through the projector 1 and in engagement with tripping arm 54. As the loop-forming members 9, 12 and levers 21, 28 are manually moved into the open position, the leading edge 46 of lug 43 cams hook 45 of lever 32 laterally allowing lug 43 to override hook 45 as shown dotted in Figs. 6, 8 and 9. In this position, the end of lever 32 is prevented from dropping away from the end of arm 42 by lip 41 engaging one of the edges of slot 39. When the operator is prepared to continue projecting film 6, control knob 36 is again moved into the forward position, drivingly connecting the drive motor to sprockets 4, 5 and repositioning hook 45 behind leading edge 46 of lug 43.

The invention has been described in detail with particular reference to a preferred embodiment thereof, but it will be understood that variations and modifications can be effected within the spirit and scope of the invention as described hereinabove and as defined in the appended claims.

We claim:

1. In a self-threading mechanism for a motion picture projector, the combination comprising: loop-forming means movable between an operative position for forming loops in a film strip, and an inoperative position; control means for the loop-forming means movable to and from a given position in which, in normal operation, the loop-forming means is positively maintained in its operative position; and overriding means providing for manual movement of the loop-forming means to said inoperative position while the control means is in said given position, said overriding means including a part of said loop-forming means interconnecting, during such normal operation, a part of said control means.

2. The invention according to claim 1 wherein said loop forming means includes an arm, said control means includes a lever, and said overriding means comprises a lug carried by said arm and a hook carried by said lever, whereby movement of said control means to said given position moves said lug and thereby said loop forming means into said closed position, said lug and hook having a cam relation for disconnecting said lug and hook upon such manual movement of the loop forming means.

3. The invention according to claim 2 wherein said lug has a sloping leading edge acting as a cam to disengage said hook and lever laterally of the direction of movement of said lug when moved by said hook.

4. In a self-threading mechanism for a motion picture projector, the combination comprising: loop forming means including a pivotal arm having a lip and lug integrally formed therewith in spaced apart relation, said loop forming means being movable between an operative position for forming loops in a film strip, and an inoperative position; control means for the loop forming means movable to and from a given position in which, in normal operation, the loop forming means is positively maintained in its operative position, said control means including a substantially reciprocally movable lever having an elongated slot for receiving said lip, and a flat portion adapted to bear on said lug and terminating in a hook; and overriding means including said hook and said lug, said hook adapted to engage and urge said lug and loop forming means into said operative position when said control means is moved to said given position, and said lug adapted to cam said hook laterally of the direction of movement of said lug to disconnect said lug and said hook when said loop forming means is manually moved into said inoperative position while said control means is in said given position.

5. The invention according to claim 4 wherein said lug has a sloping leading edge to facilitate camming said hook and lever laterally.

6. In a self threading mechanism for a motion picture projector, the combination comprising: upper and lower loop forming members movable between an operative position for forming loops in a film strip, and an inoperative position; a pivotal bellcrank having one end secured to said upper loop forming member, and its other end provided with an opening; a pivotal first lever having one arm provided with a finger receivable by said opening, a second arm secured to said lower loop forming member, and a third arm provided with a lip and a lug in spaced apart relation, said lug having a sloping leading edge; and a second lever movable to and from a given position, said second lever having an elongated slot for receiving said lip, and a flat portion terminating in a hook, said lug supporting said flat portion of said lever and cooperating with said hook to form an overriding means whereby said hook is adapted to engage said lug and urge said lug, said levers, and said loop forming members into said operative position when said second lever is moved to said given position, and said leading edge of said lug is adapted to cam said hook laterally of the direction of movement of said lug to disconnect said lug and said hook when said loop forming members are manually moved into said inoperative position while said second lever is in said given position.

References Cited in the file of this patent

UNITED STATES PATENTS

| | | |
|---|---|---|
| 1,993,735 | Foster et al. | Mar. 12, 1935 |
| 2,000,286 | Howell | May 7, 1935 |
| 2,127,143 | Ross | Aug. 16, 1938 |
| 2,172,235 | Aldinger | Sept. 5, 1939 |
| 2,420,587 | Dietrich | May 13, 1947 |